US007525680B2

(12) United States Patent
Berarducci et al.

(10) Patent No.: US 7,525,680 B2
(45) Date of Patent: Apr. 28, 2009

(54) EFFECTIVE TRANSFER OF IMAGES CAPTURED BY A DIGITAL CAMERA TO A REMOTE LOCATION

(75) Inventors: Thomas N. Berarducci, Webster, NY (US); Kenneth A. Parulski, Rochester, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 385 days.

(21) Appl. No.: 11/147,486

(22) Filed: Jun. 8, 2005

(65) Prior Publication Data

US 2005/0225799 A1   Oct. 13, 2005

Related U.S. Application Data

(63) Continuation of application No. 09/691,364, filed on Oct. 18, 2000, now Pat. No. 6,950,198.

(51) Int. Cl.
*G06F 15/00* (2006.01)

(52) U.S. Cl. .................. 358/1.15; 358/1.16; 348/207.1; 348/207.11; 709/203

(58) Field of Classification Search ....... 358/1.11–1.19; 348/207.1, 207.11; 709/203
See application file for complete search history.

(56) References Cited

U.S. PATENT DOCUMENTS

| 5,666,215 | A   |   | 9/1997  | Fredlund et al. |
|-----------|-----|---|---------|-----------------|
| 5,721,826 | A   | * | 2/1998  | Gerson et al. ............... 709/213 |
| 5,760,917 | A   |   | 6/1998  | Sheridan |
| 5,949,551 | A   |   | 9/1999  | Dellert et al. |
| 5,974,401 | A   | * | 10/1999 | Enomoto et al. .............. 705/40 |
| 6,004,061 | A   |   | 12/1999 | Manico et al. |
| 6,256,668 | B1  | * | 7/2001  | Slivka et al. ................. 709/220 |
| 6,297,856 | B1  | * | 10/2001 | Nakamura et al. .......... 348/705 |
| 6,324,521 | B1  | * | 11/2001 | Shiota et al. .................. 705/27 |
| 6,504,620 | B1  | * | 1/2003  | Kinjo ......................... 358/1.15 |
| 6,583,799 | B1  | * | 6/2003  | Manolis et al. .............. 715/838 |
| 6,652,455 | B1  | * | 11/2003 | Kocher ........................ 600/300 |
| 6,715,003 | B1  | * | 3/2004  | Safai ............................ 710/33 |
| 6,750,902 | B1  | * | 6/2004  | Steinberg et al. .......... 348/211.3 |
| 6,784,925 | B1  | * | 8/2004  | Tomat et al. ............ 348/207.11 |
| 6,813,618 | B1  | * | 11/2004 | Loui et al. ..................... 707/5 |
| 2001/0050684 | A1 | * | 12/2001 | Smith ......................... 345/467 |

FOREIGN PATENT DOCUMENTS

EP   0 856 972   5/1998

(Continued)

*Primary Examiner*—Edward L Coles
*Assistant Examiner*—Chan S Park
(74) *Attorney, Agent, or Firm*—Raymond L. Owens; Kathleen Neuner Manne

(57) ABSTRACT

A method of transferring images captured by a digital capture device to a remote memory location over a channel includes capturing a plurality of digital images using the digital capture device and storing the plurality of images in a local memory. The method also includes providing a plurality of user selectable times for the transfer of images over the channel from the local memory to the remote memory location and a user selecting one of the user selectable times, and transferring the plurality of images over the channel to the remote memory location at the user selected time.

6 Claims, 10 Drawing Sheets

FOREIGN PATENT DOCUMENTS

| | | |
|---|---|---|
| EP | 0 860 986 A2 | 8/1998 |
| EP | 0 961 451 A2 | 12/1999 |
| JP | 7281979 | 10/1995 |
| JP | 10126556 | 5/1998 |
| JP | 11-194903 | 7/1999 |
| JP | 11-308401 | 11/1999 |
| WO | WO 00/01138 | 1/2000 |

* cited by examiner

SERVICE ACCOUNT INFORMATION

```
1
2
3    USER NAME
4    PASSWORD
5    USER E-MAIL ADDRESS
6    USER SHIPPING ADDRESS
7    BILLING INFORMATION
8
9    DESIGNEE #1 SHIPPING ADDRESS
10
11   DESIGNEE #2 SHIPPING ADDRESS
12
13   PRODUCT ID -1
14   PRODUCT TYPE: ALBUM
15       PAGE SIZE: 8X10
16       ALBUM TYPE: 3 RING PUNCH - 2" THICK (50 PAGES)
17     BACKROUND STYLE: #217 - MARBLE
18     PAGE NUMBERS:
19       STYLE: - 1 -
20       FONT: HELVETICA
21       COLOR: BLUE
22       LAST PAGE NUMBER: 17
23     IMAGE NUMBERS: 1-6, 9-16
24     SHIP TO: DESIGNEE #2
25     STATUS: ORDERED, NOT YET FULFILLED
26
27   PRODUCT ID -2
28   PRODUCT TYPE: FRAMED PRINT
29       FRAME SIZE: 14X16
30       FRAME STYLE: #175 - CLASSIC - WALNUT
31       MATTE STYLE: #165 - TEXTURE - WOODGRAIN
32       IMAGE NUMBERS: 3
33       SHIP TO: DESIGNEE #2
34       STATUS: ORDERED, NOT YET FULFILLED
35
36   PRODUCT ID -3
37   PRODUCT TYPE: SERVICE PRINT
38       PRINT SIZE: 4X6
39       PRINT FINISH: GLOSSY
40       DATE STAMP: FRONT PRINT, LOWER LEFT, WHITE 12PT. HELVETICA
41       IMAGE NUMBERS: 1-18
42       SHIP TO: DESIGNEE #1
43       STATUS: ORDERED, NOT YET FULFILLED
44
45   UPLOAD TIME
46       1:00 AM EST
47   IMAGE UPLOAD LIST #1
48       IMAGE 1:   /D/DCIM/100DC280/DCP_0012.JPG    TO BE LOADED
49       IMAGE 2:   /D/DCIM/100DC280/DCP_0016.JPG    TO BE LOADED
50       IMAGE 3:   /D/DCIM/100DC280/DCP_0017.JPG    TO BE LOADED
51       IMAGE 4:   /D/DCIM/100DC280/DCP_0018.JPG    TO BE LOADED
```

FIG. 5A

```
52      IMAGE  5:   /D/DCIM/100DC280/DCP_0020.JPG     TO BE LOADED
53      IMAGE  6:   /D/DCIM/100DC280/DCP_0021.JPG     TO BE LOADED
54      IMAGE  7:   /D/DCIM/100DC280/DCP_0023.JPG     TO BE LOADED
55      IMAGE  8:   /D/DCIM/100DC280/DCP_0028.JPG     TO BE LOADED
56      IMAGE  9:   /D/DCIM/100DC280/DCP_0030.JPG     TO BE LOADED
57      IMAGE 10:   /D/DCIM/100DC280/DCP_0033.JPG     TO BE LOADED
58      IMAGE 11:   /D/DCIM/100DC280/DCP_0035.JPG     TO BE LOADED
59      IMAGE 12:   /D/DCIM/100DC280/DCP_0042.JPG     TO BE LOADED
60      IMAGE 13:  /C/MYPICTURES/VACATION/PIC0011.JPG TO BE LOADED
61      IMAGE 14:  /C/MYPICTURES/VACATION/PIC0012.JPG TO BE LOADED
62      IMAGE 15:  /C/MYPICTURES/VACATION/PIC0013.JPG TO BE LOADED
63      IMAGE 16:  /C/MYPICTURES/VACATION/PIC0023.JPG TO BE LOADED
64      IMAGE 17:  /C/MYPICTURES/VACATION/PIC0025.JPG TO BE LOADED
65      IMAGE 18:  /C/MYPICTURES/VACATION/PIC0028.JPG TO BE LOADED
```

FIG. 5B

EFFECTIVE TRANSFER OF IMAGES CAPTURED BY A DIGITAL CAMERA TO A REMOTE LOCATION

CROSS REFERENCE TO RELATED APPLICATIONS

This is a continuation of application Ser. No. 09/691,364, filed Oct. 18, 2000 now U.S. Pat. No. 6,950,198.

FIELD OF THE INVENTION

The present invention relates to an effective method of transferring images to a service provider over a channel.

BACKGROUND OF THE INVENTION

The transfer of digital images from a user to a service provider is becoming more popular and more important. Typically, a digital camera user takes a plurality of digital images that are stored on a removable memory card.

These images are transferred from the memory card and stored, for example, on a hard drive or other non-volatile memory associated with the user's computer. Although these images are printed on a local printer, such as an ink jet printer, it is often simpler and less expensive for the user to have the images printed by a service provider. There are numerous services that are provided using digital images, such as storing, printing, or producing digital storage media (e.g. CD-R discs) with duplicate copies of the digital images. These services are provided at a remote location by a service provider. When services are ordered from a service provider, the images need to be uploaded using a channel such as the Internet.

Digital images, from digital cameras or scanned photographic film, are uploaded to a web site for viewing, as described in commonly assigned U.S. Pat. No. 5,666,215 to Fredlund, et al. Using a web browser, a group of these digital images are viewed and selected for printing, for example using the Kodak Photonet Service. The user can select the size of each print to be produced, and the quantity of prints to be made from each image.

Album pages are produced from digital images by arranging numerous images on the same page, as described in commonly assigned U.S. Pat. No. 6,004,061 to Manico, et al. These album pages are customized in terms of the size and arrangement of images on the page, the size and finish of the album pages, and the background color or patterns used.

Some web sites, such as the site provided by OFOTO, enable a user to upload a group of digital images for sharing with others over the Internet and for providing digital printing services. This site permits a user to obtain an account using his e-mail address as the account name, and to provide a password and address information. The user can then upload a group of images. After all the images are uploaded, the user can select particular images for printing or sharing with third parties designated by the user. The user can return to this site at a later date, enter their e-mail address and password, and upload or print additional images. However, in all cases, each full resolution image should be uploaded to the web site before it is selected for printing or sharing.

Many existing digital cameras provide images with over two million pixels. To obtain services using these images, many large image files should be transferred over a channel to the service provider. Frequently, the channel includes a telephone modem and the Internet. As a result of the relatively low data rate channel, it takes a long time to transfer a large number of digital image files. This makes it very inconvenient for users who want to transfer a large number of digital image files for printing, since they should wait until the images are uploaded before they can order services using these images.

SUMMARY OF THE INVENTION

It is an object of the present invention to provide an effective method for transferring images over a channel to a service provider.

This object is achieved by a method of transferring images captured by a digital capture device to a remote memory location over a channel, comprising:

a) capturing a plurality of digital images using the digital capture device;

b) storing the plurality of images in a local memory;

c) providing a plurality of user selectable times for the transfer of images over the channel from the local memory to the remote memory location and a user selecting one of the user selectable times; and d) transferring the plurality of images over the channel to the remote memory location at the user selected time.

Advantages

It is an advantage of the present invention that the images are transferred over the channel to a remote location at a suitable time that is selected for effective image transfer. That time is selected so that it does not interfere with a user's operation of his or her computer or at a time when the channel, which includes the user's telephone line, is not under heavy demand.

It is a further advantage of the present invention to provide a method for obtaining digital printing services using an Internet accessible server, which permits the user to select the time at which images are uploaded. It is a further advantage of the present invention to provide a method for obtaining customized digital printing services which stores the customer's preferred service options, including a user delayed upload option, in a file that is accessed at a later time, so that the user can readily obtain the same selected preferred service options at a later time, without needing to recall and re-select their preferred service options.

BRIEF DESCRIPTION OF THE DRAWINGS

FIGS. 5A and 5B are diagrams depicting service account information;

DETAILED DESCRIPTION OF THE INVENTION

The present invention provides an effective method of transferring images to a service provider over a channel, such as the Internet. The transferred images can then be used to produce photo products, such as standard photographic prints, framed photographic enlargements, complete album pages, and PictureCD discs, or can be stored to facilitate sharing over the Internet. These photo products are customized to further include customized graphics, text, or image templates.

The user establishes a service account and selects the type of photo products that they prefer. The user also selects the images to be uploaded, and a preferred upload time option. The upload time option can represent a preferred upload initiation time, or a time window during which the transfer is desired. Image identifiers are provided for each image to be uploaded and are stored as service account information. Unlike prior art systems, the images are not immediately uploaded, but are instead uploaded at a later time in order to provide more effective (e.g. more convenient and less obtrusive) image transfer. The transaction with the user is completed, and the user can move on to another task, without waiting for the image uploading to be completed. At the appropriate time selected by the user, the image files corresponding to the image identifiers are uploaded to the service provider. The service provider then produces the photo products using the uploaded images and the user service account data.

Figure 1A:
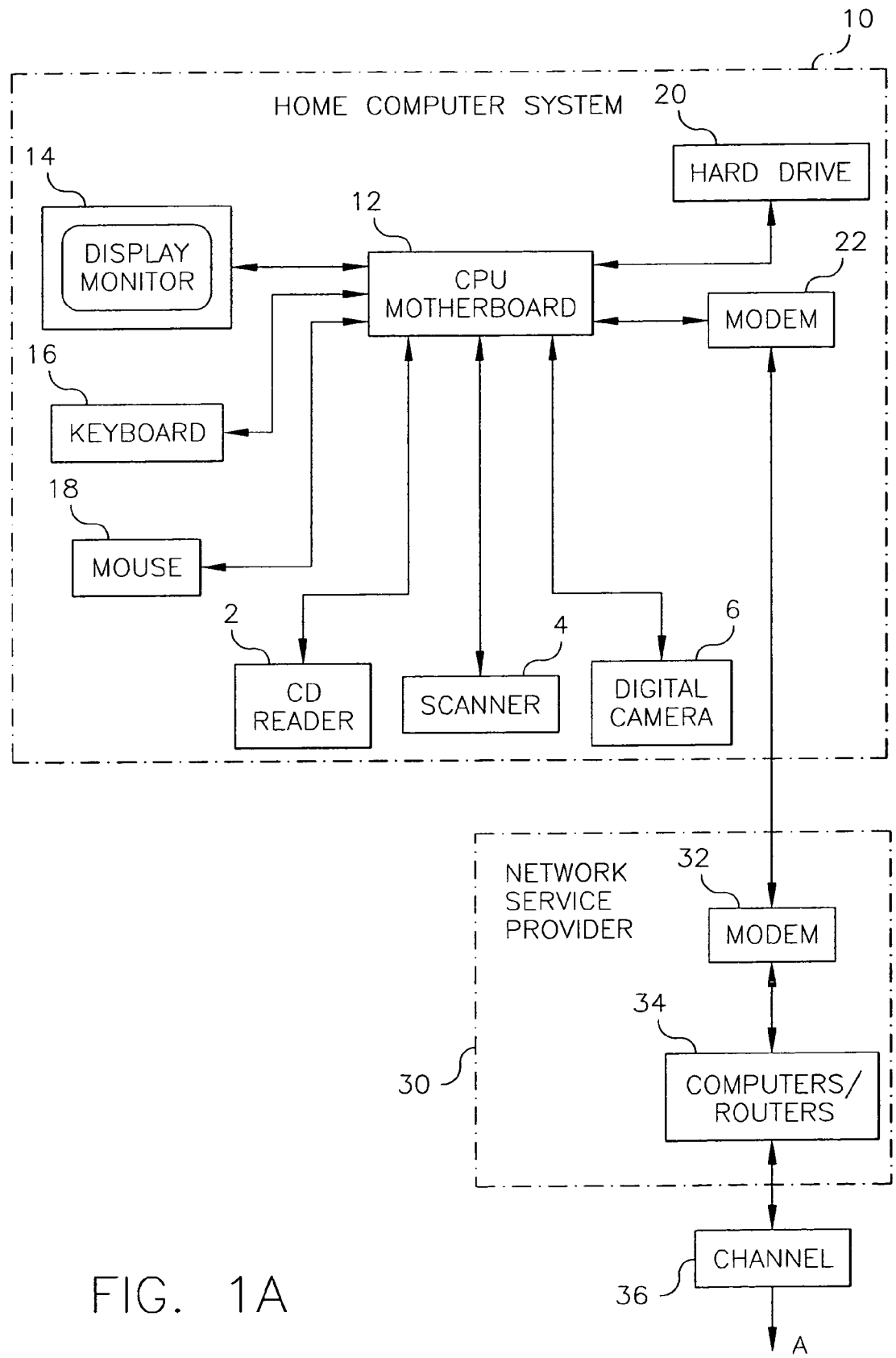
FIG. 1 depicts a block diagram of a system that implements this invention.
Figure 1B:
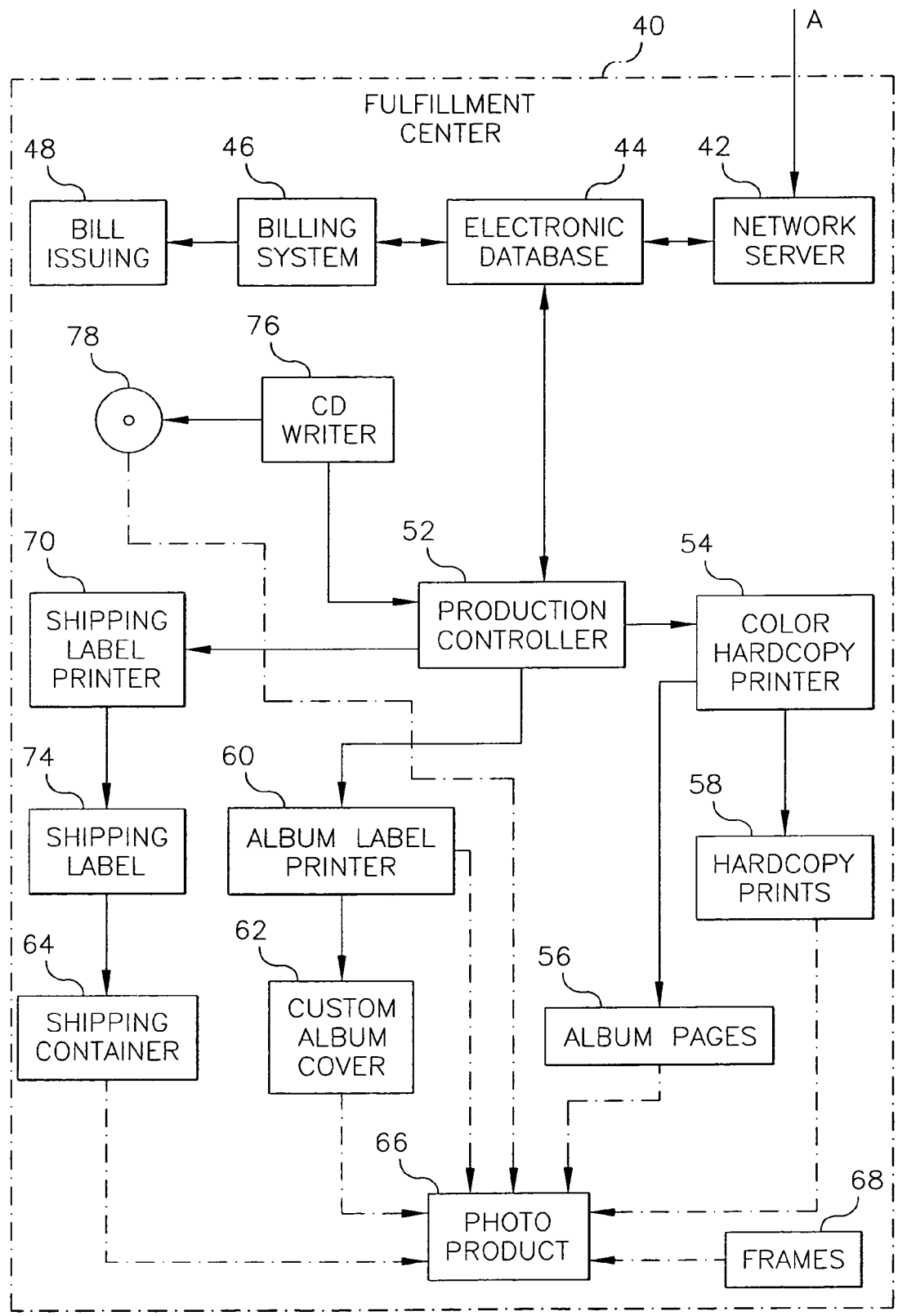

As shown in FIG. 1, the system includes a home computer system (with associated peripherals) 10 located at the customer location (e.g., the user's home). The home computer system 10 also includes equipment located at a network service provider 30, such as an Internet service provider (ISP), which communicates with the home computer system 10 to provide a network connection for the customer to a channel 36, such as the Internet. The system further includes a fulfillment center 40 which communicates with the home computer system 10 and the ISP 30 to perform the steps of selecting and effectively transferring images, and producing and shipping a photo product 66. The fulfillment center 40 includes an electronic database 44, which is located remote from the user's computer 10. It is understood that a system such as a game console, dedicated Internet appliance, or set top box can be substituted for the home computer system.

The various portions of the fulfillment center 40 are located in a single building or complex of adjacent buildings, or are geographically dispersed over several sites in different cities or even different continents. For example, the electronic database 44 and the production controller 52 are provided by computers located in different cities and interconnected via a suitable digital communications network, such as the Internet. Furthermore, the electronic database 44 can itself be distributed over several computers in several different locations.

The home computer system 10, which is, for example, a Dell Dimension XPS M200, includes a CPU motherboard 12, using, for example, a Pentium 200 MHz MMX processor as well as RAM memory. The CPU motherboard 12 executes software stored on a hard drive 20, for example, the well known Windows 98 operating system software and the Internet Explorer web browser software, both provided by Microsoft Corp. of Redmond, Wash. The CPU motherboard 12 is coupled to a display monitor 14 and a keyboard 16. A mouse 18 permits the customer to readily communicate with the CPU motherboard 12. The customer's computer 10 also includes a dial-in modem 22 for communicating with the ISP 30 in order to connect to a channel 36, such as the Internet.

The CPU motherboard 12 communicates with a color scanner 4, such as a Microtek ScanMaker E6, which can scan color photographs (not shown) and store digital images of the photographs on the hard drive 20. The CPU motherboard 12 also communicates with a CD reader 2. The CD reader 2 is used to input digital images from a CD-R disc, such as a Kodak PictureCD (not shown). The CPU motherboard 12 also communicates with a digital camera 6 via a suitable interface, such as the well known USB or RS-232 serial interfaces. The digital camera 6, for example a Kodak DC280 Zoom digital camera, is used to provide digital images. The digital images provided by the CD reader 2, scanner 4, and digital camera 6 are uploaded from the home computer system 10 to the fulfillment center 40 via ISP 30 and channel 36.

The ISP 30, for example, Earthlink Network, Inc. of Pasadena, Calif., includes banks of modems 32, one of which is connected to communicate with the modem 22 of the customer's computer 10. The modem 32 in turn communicates with computers/routers 34 in order to provide a connection to the channel 36 using equipment and techniques well known to those skilled in the art.

The fulfillment center 40 is connected to the channel 36, such as the Internet, by a network server 42, such as an Internet server, which is comprised of one or more computers and associated peripherals. The electronic database 44 provides information describing numerous photo product options, including printing a group of digital images onto album pages. The electronic database 44 is contained on the same computer as the network server 42, or can use a separate computer, or is distributed over several computers at the same physical site, or at different sites.

The electronic database 44 includes information describing different features of the albums and other photo products 66 that are selected and customized by the customer at the remote location, using the customer's computer 10. The electronic database 44 includes information describing photo product options, for example album features such as providing various background colors or textures, page numbers, page captions, and image captions. The album pages are bound in a cover, or can include holes to permit the pages to be inserted into a standard binder, such as a three-ring binder. These album feature options are demonstrated via software programs, for example, JAVA applets, MPEG or QuickTime movies, or Shockwave files, which depict the functionality of features that the customer can choose.

When a photo product 66 is purchased by the user, the electronic database 44 communicates with a billing system 46 to verify that the payment identifier (e.g., credit card or debit card number) provided by the customer is valid, and to debit the account for the purchase. As shown in block 48, the bill is issued. The customer's account that is debited can, of course, be located at a remote financial institution. Typically, as with credit cards, this financial institution will make payment to the direct provider or seller of shippable photo product 66. This is generally done by wiring the amount into the direct provider's account, generally an account established with another financial institution.

As shown in FIG. 1, the electronic database 44 is connected to production controller 52. The production controller 52 controls one or more color hardcopy printers 54, which can produce album pages 56 or separate hardcopy prints 58. The hardcopy prints are placed in frames 68. The production controller 52 is also connected to a CD writer 76, which can produce PictureCDs 78 having digital images and application software for using the digital images.

The production controller 52 can optionally be connected to devices (not shown) for producing t-shirts, and coffee mugs, incorporating one or more images uploaded by the user. The production controller 52 is also connected to an album label printer 60 that produces labels that are attached to a standard album cover to provide custom album cover 62.

The electronic database 44 also optionally provides long-term storage of the uploaded images. The stored images are accessible (e.g. viewable) via the Internet by authorized users, as described, for example, in commonly assigned U.S. Pat. No. 5,760,917 to Sheridan, the disclosure of which are herein incorporated by reference.

The production controller 52 also controls a shipping label printer 70 to produce a shipping label 74. The shipping label 74 is attached to a shipping container 64 (e.g., a cardboard box containing packing material) that contains and protects the photo product 66 during shipment (e.g., via air express mail, and ground carrier) to the customer or the customer's designee.

Figure 2A:
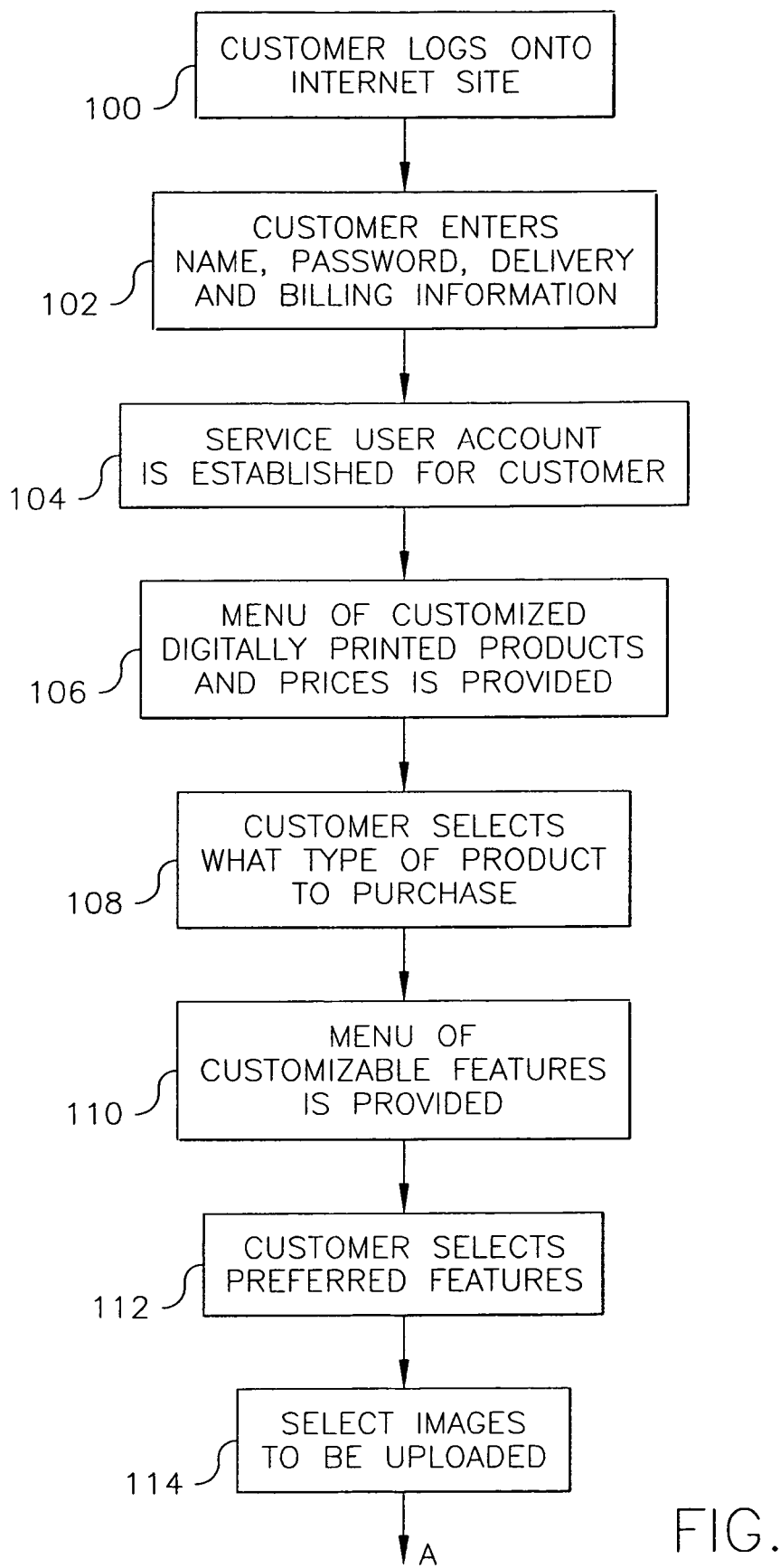
FIG. 2 is a flow diagram of a typical transaction for providing customized photo products over a network using effective transfer of images from a user to a service provider.
Figure 2B:
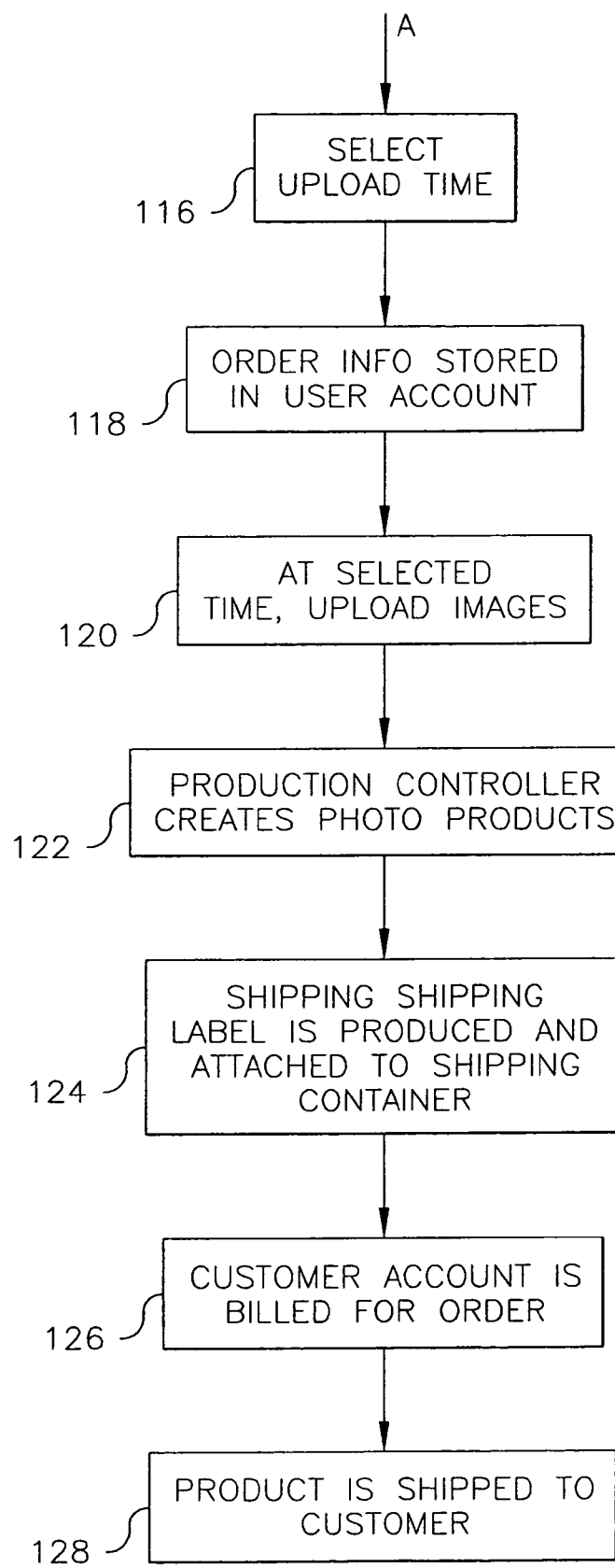

Turning now to FIG. 2, there is shown a flow diagram of a typical method for effectively transferring images from a user to a service provider to produce photo products, such as prints, albums, and PictureCDs. As shown in block 100, the customer, using a digital communication network, logs onto the channel 36, which is the Internet. The customer can, of course, use a service provider, such as the ISP 30, to gain access to the channel 36. The ISP 30 uses an address, such as an Internet protocol (IP) address, to establish a connection between the customer's computer 10 and a product provider or seller that owns or controls the fulfillment center 40.

In block 102, the customer enters their name, selects a password, and provides delivery and billing information. This information identifies the customer and the customer's designee (e.g. the person to whom the photo product 66 should be shipped, which can of course be the customer). It includes addresses of both the customer and one or more of the customer's designees. The customer also identifies an account to be debited to pay for the photo product(s) to be purchased. Often this will be a credit card having a payment identifier that specifies the account of the customer to be charged or debited. Frequently, this will be in a financial institution. The payment identifier is a credit card number that specifies a particular credit card account. As used in this specification, a credit card will also include a debit card.

In block 104, a user service account is established for the customer. The information stored in the service account includes the information entered by the customer in block 102. This service account information will later be augmented by additional information listing the photo product options selected by the customer, and image identifiers that correspond to image files to be uploaded from the customer's computer 10 to the fulfillment center 40. FIGS. 5A and 5B provide an example of the service account information. The billing information (e.g. credit card number) and other sensitive information provided in the service account are encrypted to prevent discovery and unauthorized use. The service account information is preferably stored as part of the electronic database 44 of the fulfillment center 40. Alternatively, it is possible for some of the service account information to be stored in the customer's computer 10, for example on the hard drive 20. For example, the image identifiers corresponding to images to be uploaded are stored using hard drive 20.

Figure 3:
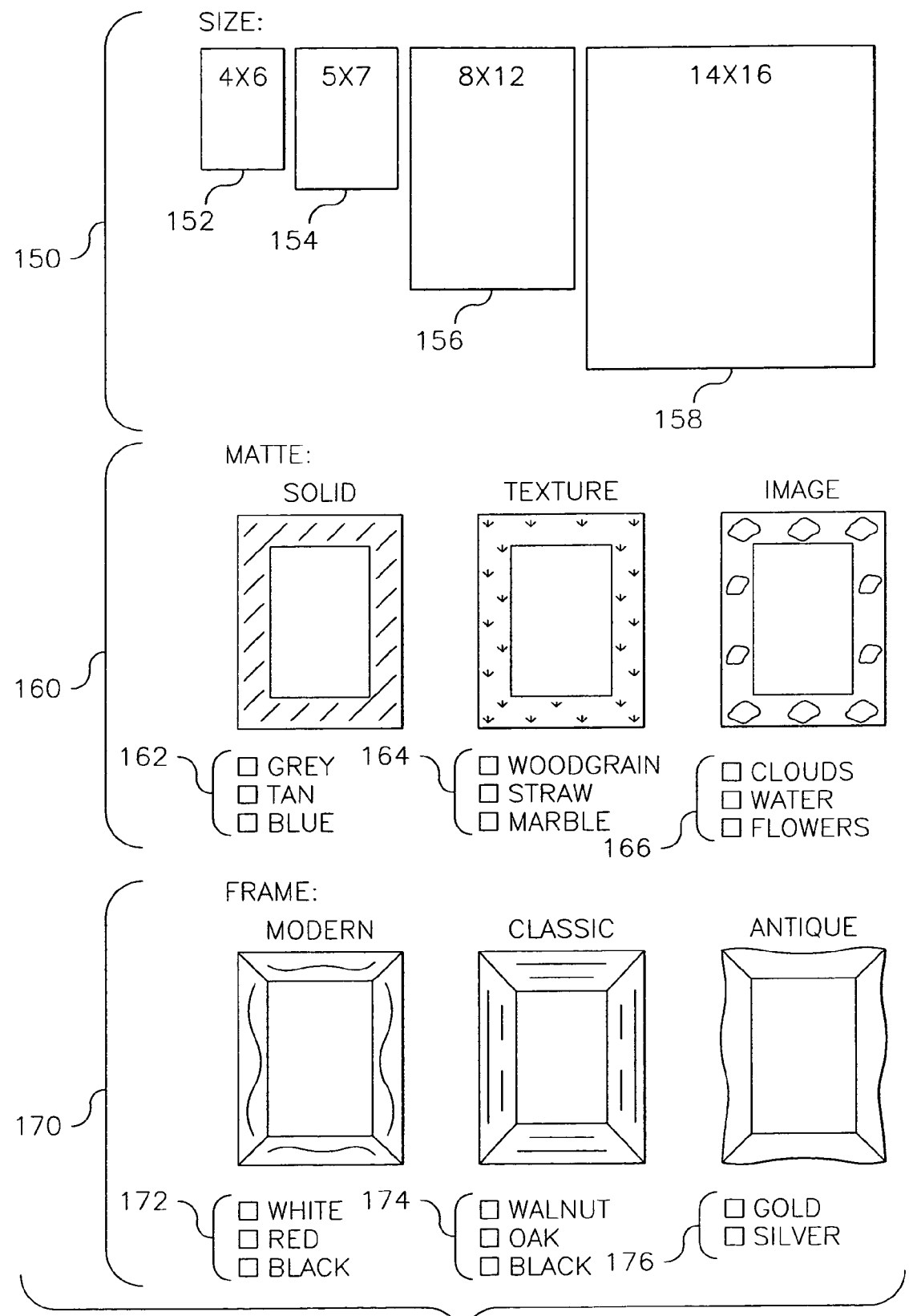
FIG. 3 depicts a selection of print sizes, picture frame styles, and picture frame mattes provided by the system of FIG. 1.
Figure 4:
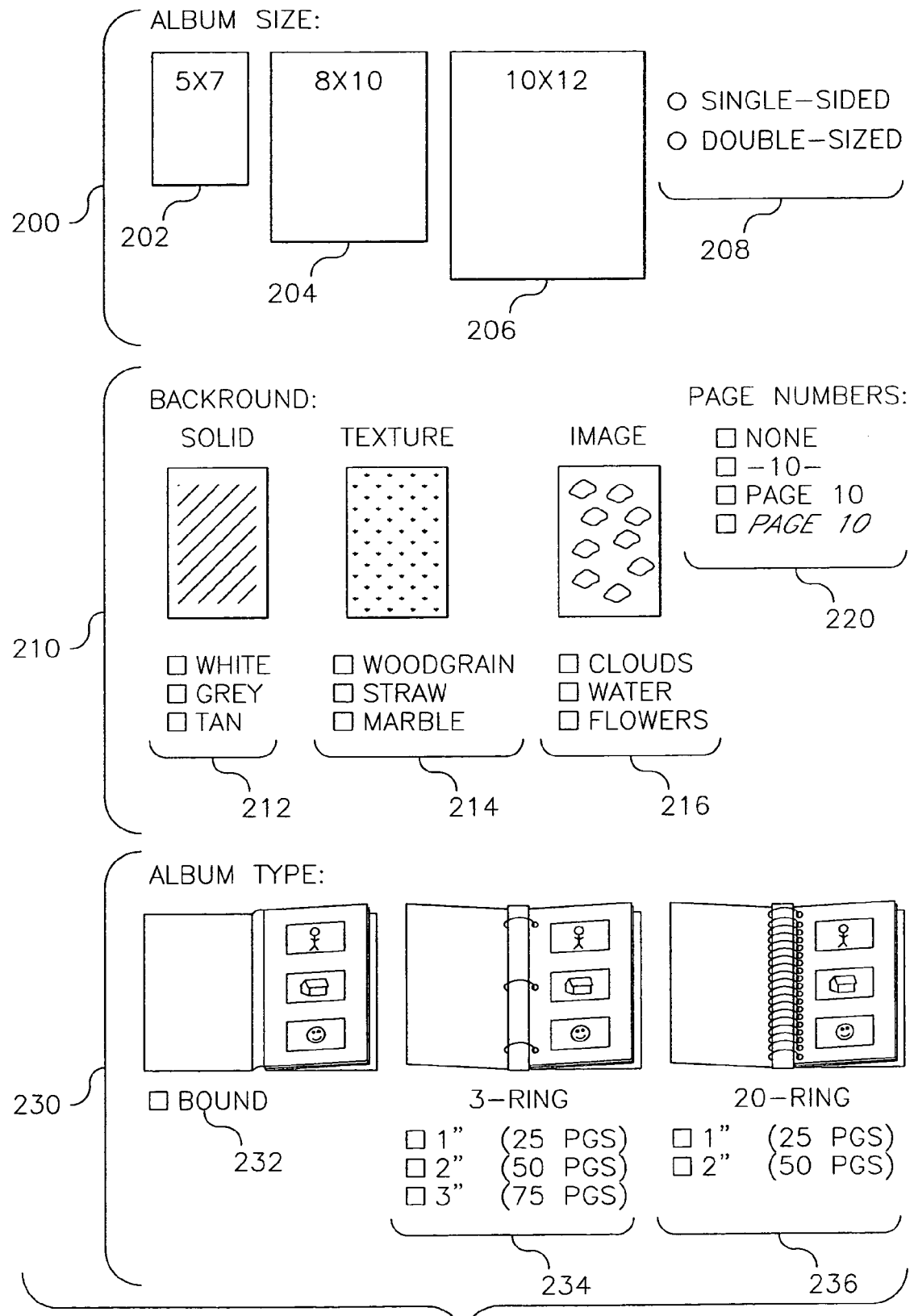
FIG. 4 depicts an album page that is provided by the system of FIG. 1.

In block 106, the fulfillment center 40 provides the customer with a menu of photo products 66 that are available for customization and purchase, such as standard service prints, framed hardcopy prints as depicted in FIG. 3, and customized photo albums as depicted in FIG. 4. In block 108 the customer selects what type of products (e.g. standard service prints, framed hardcopy prints, or customized photo albums) to purchase. The fulfillment center 40 can also provide the customer with preferred times for image uploads. In this fashion, the fulfillment center can optimize throughput and reduce the possibility of excess incoming data. The fulfillment center 40 can provide incentives such as lower prices or free products for preferred upload times.

In block 110, the network server 42 provides a menu of customizable features for the type of product selected by the user. This menu is displayed on display monitor 14 if the user is located at the home computer system 10. In block 112, the customer selects preferred features for the product type they selected in block 108.

The options for standard prints include providing the prints in various sizes (e.g. 3"×5" and 4"×6") and various surface finishes (e.g. glossy and matte finish). The standard prints can also include text, such as the date the picture was captured or printed. The date the pictures were captured is obtained from the digital image file to be uploaded, if the picture was taken by a digital camera or by an APS film camera having a real-time clock. The user can select whether or not to include this date stamp, where to position the text (e.g. on the front at the lower left, or on the back of the print.). The user can also select the color (e.g. white or yellow) and the font (e.g. Helvetica or Script) for the date stamp.

FIG. 3 depicts framed options that are selected by the user. The options include selecting the size of the print from a plurality of print sizes 150, including 4"×6" size 152, 5"×7" size 154, 8"×10" size 156, and 14"×16" size 158. The user selects the size by selecting the appropriate print size icon (e.g. icon 152, 154, 156, or 158). The options also include selecting a matte style from a plurality of styles 160, including solid mattes 162 in gray, tan, and blue, textured mattes 164 in wood grain, straw, or marble, and background image mattes 166 including clouds, water, or flowers. The user selects the matte by selecting the appropriate radio button (e.g. one of buttons 162, 164, or 166) for their preferred matte style. The user then selects a picture frame style from a variety of styles 170, including modern styles 172 in white, red, and black, classic styles 174 in walnut, oak, and black, and antique styles 176 in gold and silver. The user selects the picture frame style by selecting the appropriate radio button (e.g. one of buttons 172, 174, or 176) for their preferred frame style. Of course, many more size, matte, and frame options are presented to the user using various types displays, such as pull-down menus, and scroll bars. The selected combination of print size, matte style and frame style is then presented to the user. For example, if the user selects a classic walnut frame with a texture wood grain matte, the Internet server 42 would present to the user an image depicting this combination for the user to review.

FIG. 4 depicts album options that are selected by the user. The options include selecting the size of the album from a plurality of sizes 200, including 5"×7" size 202, 8"×10" size 204, and 10"×12" size 206. The user selects the size by selecting the appropriate album size icon (e.g. icon 202, 204, or 206). The options also include using radio buttons 208 to select single-sided pages (e.g. print only on 1 side of the album page) or double-sided pages. The options further include selecting a preferred background style from a plurality of styles 210, including solid backgrounds 212 in white, gray, or tan, textured backgrounds 214 in wood grain, straw, or marble, and background images 216 including clouds, water, or flowers. The user selects the background style by selecting the appropriate radio button (e.g. one of buttons 212, 214, or 216). The user then selects whether to include a page number from a plurality of options using radio buttons 220. The options include no page numbers and several different styles of page numbers. The color, size, and font of the text used for the page numbers and image captions can also be selected using a separate menu (not shown). Finally, the user selects an album type from a plurality of album types 230. The album type is selected by the user by selecting one of the radio buttons for bound albums 232, 3-ring albums 234 (including 1", 2", and 3" thick 3-ring albums) or 20-ring albums 236 (including 1" and 2" thick albums). Of course, many more size, background, and album type options are presented to the user using various types displays, such as pull-down menus, and scroll bars. The selected combination of album size, background, page numbers, and album type is then presented to the user. For example, if the user selects a 8"×10" double-sided album pages in a 3-ring, 2" thick binder with a marble texture background and a particular page number style, the internet server 42 presents to the user an image depicting this combination for the user to review.

Figure 7:
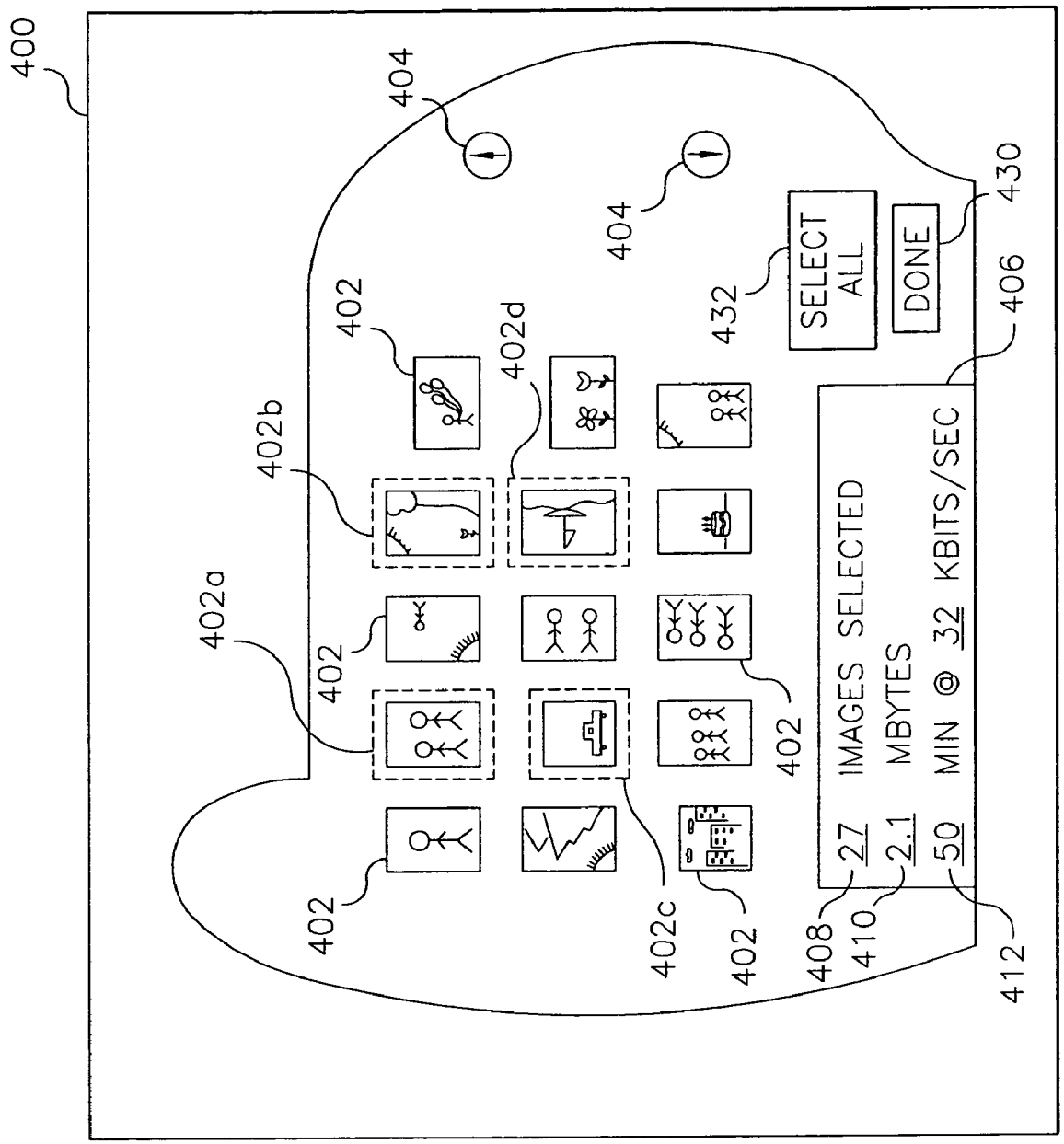
FIG. 7 is a graphical user interface screen to enable a user to select images to be uploaded and an effective transfer time.

In block 114 of FIG. 2, the customer selects images to be uploaded in order to be used in their selected type of photo product. In a preferred embodiment, the CPU 12 displays on the display monitor 14 a display screen 400 as shown in FIG. 7. The display screen 400 includes a two-dimensional array of thumbnail images 402 obtained from the digital camera 6, the CD reader 2, or the hard drive 20. The thumbnail images 402 preferably are thumbnail images stored within the Exif/JPEG image files provided by the digital camera 6. The user selects all of the images, or a subset of the images, by clicking the mouse 18 on the "select all" icon 432, or on any number of thumbnail images 402. FIG. 7 shows that four thumbnail images 402a, 402b, 402c, and 402d (which are outlined) have been selected.

In order to select desired images from a large number of thumbnail images 402, arrow controls 404 on the right portion of the display screen 400 enable the user to scroll through the larger number of thumbnail images 402 to view a group of the thumbnail images 402 (e.g., 15 thumbnail images) at a time. The user can then select additional images (e.g., three images) to be printed by again pressing the control key or the shift key on the keyboard 16 while clicking the mouse 18 on any number of thumbnail images 402.

As the user selects images, an image data upload indicator 406 displays the number of images selected for uploading 408 (e.g. 27 images), as well as other information such as the total size of all of the selected files 410 (e.g. 12.1 Mbytes total for all selected images) and the estimated time for image uploading 412 (e.g. 50 minutes) given the data rate of the user's modem 22 (e.g. 32 kbit/sec average net upload speed).

In block 116, the user selects their preferred upload time using upload time selector 420 in FIG. 7. The options include immediately after completing the order process 422, waiting until the user logs off his computer 424, or waiting until a particular time selected by the user 426. The user can enter a different time, in place of the default time of 1:00 am local time, using the keyboard 16 or by clicking the mouse 18 on the up/down arrows 428. In alternative embodiments, the user can also select a time for uploading images from a list of preferred times in block 115 provided by the fulfillment center 40, or after a preselected number of minutes of inactivity (e.g. after 10 minutes of inactivity), or concurrently in the background as a low priority task. Finally, the user clicks on the "done"icon 430. At this point, the user is presented with one or more display screens (not shown) depicting the final products to be delivered, and confirming the cost of the products. The user can then approve the order and log off of the Internet site.

In block 118, the image identifiers corresponding to the customer's selected images, the customer's selected upload time, and the customer's selected photo product options are added to the user's service account information. The image identifier is the image file name, if all images to be uploaded are located in the same folder or directory on the user's computer 10, such as the same folder or directory on the hard drive 20. Alternatively, the image identifier is a complete pathname specifying the storage device and the directory structure needed to locate each image. Alternatively, the image identifier is data string which matches a data string within the corresponding image file, such as an GUID (globally unique ID), and image number, an image title, or the like.

As shown in the example depicted in FIGS. 5A and 5B, the service account information can include information for several products having different identifiers (ID) such as Product ID-1 (lines 13-25) that specifies a customized album, Product ID-2 (lines 27-34) that specifies a framed print, and Product ID-3 (lines 36-43) that specifies customized service prints. The album related information (lines 13-25) includes the page size, album type, and background style selected. It also includes page number information, such as the style, font, and color of the text, and the last page number printed. The last page number information is updated each time new album pages are printed. It is used to automatically tell the user when an album has been filled, and a new album needs to be purchased. The album related information also includes a list of image numbers (line 23) to be included in the album. These image numbers correspond to image identifiers listed in the Image upload list section (lines 47-65) of FIGS. 5A and 5B. The album related information also indicates that designee #2 should receive the order (line 24) and the order status (line 25). The order status indicates that this photo product has been ordered by the user, but not yet fulfilled. Once fulfilled, the status will be updated to indicate that this order has been completed.

The framed print information (lines 27-34) specifies the frame size, frame style and color, and matte style. It also includes a list of image numbers (line 32) to be used to produce the framed print. This image number (Image number 3) corresponds to image identifier listed for image number 3 in the Image upload list section (line 50) of FIGS. 5A and 5B, which is the image identified as /D/DCIM/100DC280/DCP__0017.JPG, the path name of the image on the user's computer 10. The information also indicates that designee #2 should receive the order (line 33) and the order status (line 34).

The service print information (lines 36-43) specifies the print size, print finish, and the location, font style, size, and color of the date to be overlaid in the print. It also includes a list of image numbers (line 41) to be printed. The information also indicates that designee #1 should receive the prints (line 42) and the order status (line 43). The service print information can also specify other text or graphics selected by the user that should be added to the images when they are printed.

The upload time information (lines 45-46) indicates the user selected upload time. At line 46, it indicates an upload time of 1:00 am eastern standard time (EST). The upload time information can alternatively indicate "immediately" or "as user logs off".

The image upload list (lines 47-65) provides a list of image identifiers corresponding to the images to be uploaded, which were selected by the user in block 114. The upload list provides a reference number (e.g. Image 1), a pathname to the image file on the user's computer that is to be uploaded (e.g. /D/DCIM/100DC280/DCP__0012.JPG). This pathname points to the JPEG/Exif image named DCP__0012.JPG located in the folder named 100DC280 within the folder named DCIM on the "D" drive of the user's computer 10, which in this example is the drive name used for the digital camera 6. The upload list also includes an upload status for the image (e.g. "To be uploaded"). As the images are uploaded, this status is updated. In case of interruptions or errors, only those images not yet uploaded will need to be transferred.

The service account information is stored in electronic database 44. Alternatively, some or all of the service account information can instead be stored on hard drive 20, or can be duplicated on hard drive 20 of home computer system 10. When all the necessary service account information has been captured, the fulfillment center 40 can send a message confirming the receipt of the service order.

In block 120, at the indicated time, the digital images are uploaded to the service provider. The upload time is the time selected by the user in 116. In some cases, this is immediately after the user confirms the order. In other cases, the images are uploaded when the user initiates the process of shutting down their computer. In this situation, the images are transferred, and then the shut down process is completed. In other cases, the images are transferred at a specified time, typically at night when the user's computer and phone line are unlikely to be needed. Of course, this requires that the user's computer remain powered on, or in a low power standby state until it is "woken up", for example by the task scheduler program in Microsoft Windows 98. As the images are uploaded, the image upload status (lines 48-65 in FIGS. 5A and 5B) is updated to indicate which images have been successfully uploaded. In the unlikely event that the consumer needs the phone line while the image uploading is being conducted, the uploading will terminate. This is noted by the user's computer 10 or the network server 42, which can automatically re-establish the connection at a later time, via the network service provider 30, and upload the images having a status of "To be uploaded".

After all the images are uploaded, in block 122, the fulfillment center 40 can send a message to the user's email account to confirm receipt of the images, and production controller 52 produces the customized photo products using the uploaded images and the service print information stored in electronic database 44. If the user has ordered an album, the uploaded digital images are automatically arranged on the pages and printed by color hard-copy printer 54 to produce album pages 56 as described in commonly assigned U.S. Pat. No. 6,636,648 issued Oct. 21, 2003 to Loui, et al., and U.S. Pat. No. 6,389,181 issued May 14, 2002 to Shaffer, et al. The last page number (line 22) in the service account information depicted in FIG. 5A is updated to reflect the number of album pages that will be produced to show the uploaded images. Alternatively, as part of block 114, the user can manually arrange the images on the pages and also select preferred colors, messages, logos, or images for the custom album cover 62.

If the user has ordered framed prints, the digital images are printed using color hardcopy printer 54 to produce hardcopy prints 58. Each hardcopy print 58 includes the user selected matte border, for example the texture—wood grain border specified in line 31 of FIG. 5A. Each hardcopy print 58 is then framed using the appropriate frame 68, for example the classic—walnut frame specified in line 30 of FIG. 5A. If the user has ordered service prints, the digital images are printed using color hardcopy printer 54 to produce hardcopy prints 58. The hardcopy prints 58 use the size and finish specified in lines 38-39 of FIG. 5A. Before printing, each digital image is overlaid with the date stamp as specified in line 40 of FIG. 5A. If the user has ordered one or more PictureCDs using the uploaded images, the PictureCDs 78 are produced using CD Writer 76.

In block 124, the production controller 52 in FIG. 1 controls the shipping label printer 70 to produce the shipping label 74 using the shipping address of the customer or customer's designee provided in the service account information (FIGS. 5A and 5B). The shipping label 74 is attached to the shipping container 64 that is used to ship the photo product 66.

In block 126, the customer account provided in the service account information (FIGS. 5A and 5B) is billed for the order. At this point, the financial institution having the customer's account designates such funds for transfer to the product provider or seller.

In block 128, the photo product 66 incorporating the first group of digital images is delivered to the customer or the customer's designee. The term "delivery" means that the photo product 66 is shipped to the customer or the customer's designee by the U.S. Postal Service (USPS) or by a carrier service, such as the United Parcel Service (UPS) or Federal Express. Alternatively, the photo product 66 is delivered to a location such as the store where the retail kiosk is located, where the customer can pick it up. When the billing provided in step 126 is delayed until the customer picks up the photo product 66, and the customer can then pay for the photo product 66 using cash, check, or a charge/debit card.

After the photo products are shipped to the user in block 124, the digital images uploaded by the user in step 116 are deleted from electronic database 44 in FIG. 1 if the user does not request that they be maintained for long term storage and "sharing" via the Internet. The service account information in FIGS. 5A and 5B is retained, however, so that it is used for subsequent orders by the same customer. This typically occurs many weeks or months later, when the user wants to print additional images. At this time, the customer again logs onto the Internet site and enters their name and password, similar to block 100. Alternately, the home computer system 10 can include a "cookie" produced and stored on hard drive 20 when the user first accessed the Internet site in step 100. This "cookie" can automatically identify the user account. In response, the network server 42 accesses, from the electronic database 44 in FIG. 1, the service account information for the customer. The network server 42 provides a display for the user based on the Product ID information stored in the user's service account. For example, if the user had selected a classic walnut frame with a texture wood grain matte in step 112, the Internet server 42 would present to the user an image depicting this combination for the user to review. If the user had also selected a 8"×10" double-sided album pages in a 3-ring, 2" thick binder with a marble texture background and a selected page number style in step 112, the Internet server 42 would also present to the user an image depicting this combination for the user to review. The network server 42 also permits the user to select new types of products to purchase, and to customize the products, as provided earlier in blocks 106 to 112.

The customer then selects another set of images to be uploaded, as described earlier in relation to block 114. As in block 114, this is done by selecting to upload all the images from a particular CD inserted in CD reader 2 or stored in digital camera 6 or by individually selecting images to be uploaded. The user can use their default upload time stored in their service account, or can select a different upload time. The service account information is updated to reflect the new order information. At this point, the customer is presented with one or more display screens showing the final products to be delivered, and confirming the cost of the products. The user can then approve the order and log off of the Internet site.

At the appropriate time, this second group of digital images is uploaded, as described earlier in relation to block 120. The production controller 52 then produces the photo products ordered by the user, as described earlier in relation to block 122. The production controller 52 then produces the customized photo products using this second group of images, and the service account information stored in electronic database 44. If the user has ordered an album, the last page number (line 22) in the service account information depicted in FIGS. 5A and 5B is updated to reflect the number of album pages that will be produced to show the uploaded images. If the number of new album pages to be produced will exceed the capacity of the customer's current album (e.g. if the print count will be 54, which is more than 50 pages for the 2" thick binder in FIG. 4), the user is automatically advised that a new album will be ordered to store some of the new album pages, and the page numbers printed on the album pages are numbered accordingly. In the above example, the last 4 pages (e.g. prints 51 to 54) are given page numbers 1 to 4 and provided in a new album, while the other pages will be included in the earlier 3-ring album provided as part of the earlier order.

Finally, the shipping label 74 is produced and attached to the shipping container 64, the customer account is billed for the order, and the photo product(s) incorporating the second group of images are shipped to the customer or customer's designee, as described earlier in relation to blocks 124 to 128.

The user can of course repeat this process many times, with new groups of digital images, to simply and readily obtain similarly customized photo products. For example, the user can, over the course of several years, obtain a set of frame prints having similar frame styles and matte colors, without needing to re-enter, or even remember, the choices they had made for their earlier orders.

Figure 6:
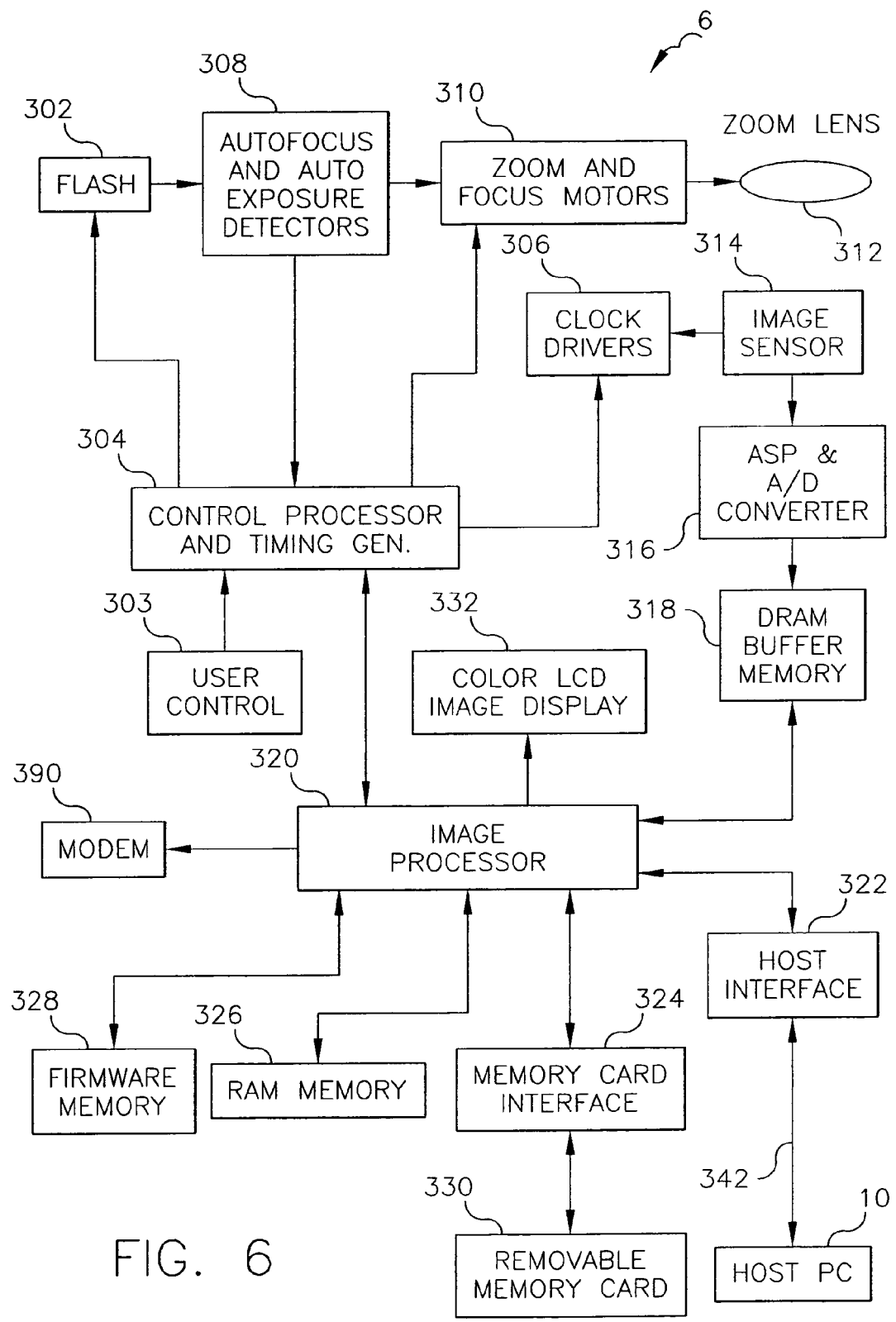
FIG. 6 depicts in more detail a digital camera shown as a block in FIG. 1.

FIG. 6 is a block diagram showing the electronic camera 6 in more detail. The electronic camera 6 produces digital images that are stored on the removable memory card 330. The electronic camera 6 includes a zoom lens 312 having zoom and focus motor drives 310 and an adjustable aperture and shutter (not shown). The zoom lens 312 focuses light from a scene (not shown) on an image sensor 314, for example, a single-chip color CCD image sensor, using the well known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which is flash EPROM memory.

The processed digital image file is provided to a memory card interface 324 that stores the digital image file on the removable memory card 330. Removable memory cards 330 are known to those skilled in the art. For example, the removable memory card 330 can include memory cards adapted to the *CompactFlash Specification Version* 1.3, published by the CompactFlash Association, Palo Alto, Calif., Aug. 5, 1998. Other types of digital memory devices, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The processor 320 also produces a "thumbnail" size image that is stored in RAM memory 326 and supplied to the color LCD image display 332, which displays the captured image for the user to review. The electronic camera 6 is controlled by user controls 303, such as a series of user buttons including a shutter release (e.g., capture button) (not shown) that initiates a picture taking operation. The graphical user interface displayed on the color LCD image display 332 is controlled by the user interface portion of the firmware stored in the firmware memory 328.

After a series of images have been taken and stored on the removable memory card 330, the removable memory card 330 is inserted into the card reader (not shown) in home computer 10. Alternatively, an interface cable 342 is used to connect between the host interface 322 in the electronic camera 6 and the CPU motherboard 12 in home computer system 10. The interface cable 342 can conform to, for example, the well known universal serial bus (USB) interface specification.

The digital camera 6 can produce an image utilization file listing the images to be printed, as described in commonly assigned U.S. Pat. No. 6,573,927 issued Jun. 3, 2003 to Parulski, et al. This image utilization file can digital print order format (DPOF) file. The DPOF file is used to automatically identify the digital images to be uploaded, replacing block 114 in FIG. 2.

The digital camera 6 can also store a service account identifier in the firmware memory 328, as described in commonly assigned U.S. patent application Ser. No. 09/534,469, filed Mar. 24, 2000 to Parulski, the disclosure of which is herein incorporated by reference. The service identification number can then be stored onto the removable flash memory 330, either as part of each image file, or as a separate digital record, so that it is used to automatically access the service account for the user.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

Parts List

2 CD reader
4 color scanner
6 digital camera
10 home computer system
12 CPU motherboard
14 display monitor
16 keyboard
18 mouse
20 hard drive
22 dial-in modem
30 internet service provider
32 modem
34 computers/routers
36 channel 40 fulfillment center
42 network server
44 electronic database
46 billing system
48 bill issuing
52 production controller
54 color hardcopy printers
56 album pages
58 hardcopy prints
60 album label printer
62 custom album cover
64 shipping container
66 photo product Parts List (Con't)

68 frames
70 shipping label printer
74 shipping label
76 CD writer
78 PictureCD
100 block
102 block
104 block
106 block
108 block
100 block
110 block
112 block
114 block
116 block
118 block
120 block
122 block
124 block
126 block
128 block
150 print sizes
152 print size
154 print size
156 print size
158 print size Parts List (Con't)

160 matte styles
162 solid mattes
164 textured mattes
166 background image mattes
170 picture frame styles
172 modern picture frame style
174 classic picture frame style
176 antique picture frame style
202 album size
204 album size
206 album size
208 radio buttons
210 background style
212 solid background style
214 textured backgrounds
216 background images
220 radio button
230 album types
232 bound albums
234 3-ring albums
236 20-ring albums
302 flash 303 users controls
304 control processor and timing generator circuit
306 clock drivers
308 autofocus and autoexposure detectors
310 zoom and focus motor drives
312 zoom lens
314 image sensor Parts List (Con't)

316 analog signal processing and analog-to-digital converter circuit
318 DRAM buffer memory
320 processor
322 host interface
324 memory card interface
326 RAM memory
328 firmware memory
330 removable memory card
332 color LCD image display
342 interface cable
400 display screen
402 thumbnail images
402a thumbnail image
402b thumbnail image
402c thumbnail image
402d thumbnail image
404 arrow controls
406 upload indicator
408 number of images
410 total file size
412 transfer time
420 upload time selector
422 immediate option
424 logoff option
426 time option
428 up/down arrows
430 done icon
432 select all icon

What is claimed is:

1. A method of selecting and transferring images captured by a digital camera to a remote memory location of a fulfillment center over a channel, comprising:

a) capturing a plurality of digital images using a digital camera;

b) storing the plurality of digital images in a local memory;

c) displaying the plurality of digital images for viewing by a user and enabling the user to select one or more particular image from the plurality of digital images to be transferred;

d) enabling the user to select a user selectable time for the transfer of the one or more particular image over the channel from the local memory to the remote memory location, wherein a choice of one or more user selectable time is provided to the user by the fulfillment center; and e) causing the transfer of the selected one or more particular image over the channel to the remote memory location at the selected user selectable time, the user selectable time for transfer being chosen by the user.

2. The method according to claim 1 wherein the local memory is removable flash memory card.

3. The method according to claim 1 wherein the local memory is a hard drive.

4. The method according to claim 1 wherein the displayed images are thumbnail images, and wherein the thumbnail images arc stored within Exif/JPEG files provided by the digital camera.

5. The method according to claim 1 further including the step of a service provider providing long-term storage of the transferred one or more particular image.

6. The method according to claim 5 further including the step of enabling the transferred one or more particular image to be accessed using the Internet.

* * * * *

UNITED STATES PATENT AND TRADEMARK OFFICE
CERTIFICATE OF CORRECTION

PATENT NO. : 7,525,680 B2
APPLICATION NO. : 11/147486
DATED : April 28, 2009
INVENTOR(S) : Thomas N. Berarducci et al.

It is certified that error appears in the above-identified patent and that said Letters Patent is hereby corrected as shown below:

Column 15, line 3　　In Claim 4, delete "arc" and insert -- are --, therefor.

Signed and Sealed this

Fifth Day of January, 2010

David J. Kappos
*Director of the United States Patent and Trademark Office*